United States Patent [19]

Chiang

[11] Patent Number: 5,720,272
[45] Date of Patent: Feb. 24, 1998

[54] BARBECUE GRILL ASSEMBLY

[76] Inventor: Chih-ming Chiang, 7th Fl., No. 25, Lane 33, Sec. 2, Hsingan Rd., Taichung, Taiwan

[21] Appl. No.: 711,363

[22] Filed: Sep. 4, 1996

[51] Int. Cl.⁶ .............................. A47J 37/00; A47J 37/07
[52] U.S. Cl. ..................... 126/25 R; 99/450; 99/482; 126/9 R; 220/315
[58] Field of Search ............... 99/339, 340, 419–421 V, 99/450, 482, 444–449; 126/25 R, 25 A, 9 R, 9 B, 9 A, 41 R, 275 R; 220/314–316, 333, 334, 347, 211, 254, 4.28

[56] References Cited

U.S. PATENT DOCUMENTS

| | | | |
|---|---|---|---|
| 3,567,065 | 3/1971 | Dinse | 220/315 |
| 4,463,746 | 8/1984 | Knuth et al. | 126/25 R |
| 4,467,709 | 8/1984 | Anstedt | 99/482 |
| 4,587,947 | 5/1986 | Tomita | 126/9 R |
| 4,630,593 | 12/1986 | Gremillion | 126/25 R |
| 4,932,390 | 6/1990 | Ceravolo | 126/25 AA |
| 5,070,777 | 12/1991 | Novak | 99/482 |
| 5,121,738 | 6/1992 | Harris | 126/41 R |
| 5,159,917 | 11/1992 | Archer et al. | 126/9 R |
| 5,404,801 | 4/1995 | Holland | 99/450 X |
| 5,566,606 | 10/1996 | Johnston | 99/446 |
| 5,582,094 | 12/1996 | Peterson et al. | 99/445 |
| 5,645,041 | 7/1997 | Yu | 126/25 R |

*Primary Examiner*—Timothy F. Simone
*Attorney, Agent, or Firm*—Dellett and Walters

[57] ABSTRACT

A barbeque grill assembly includes a body having a first annular wall with an inner side and an outer side, at least one positioning member fixedly mounted on the outer side of the first annular wall of the body, and a lid including a second annular wall detachably mounted on the first annular wall of the body and having at least one slot defined therein for receiving the positioning member.

6 Claims, 7 Drawing Sheets

5,720,272

1

BARBECUE GRILL ASSEMBLY

FIELD OF THE INVENTION

The present invention relates to a barbeque grill assembly.

BACKGROUND OF THE INVENTION

A conventional barbeque grill assembly is shown in FIG. 9 and there will be a complete illustration in the detailed description of the preferred embodiments, concerning the conventional barbeque grill assembly.

The present invention has arisen to mitigate and/or obviate disadvantages of the conventional barbeque grill assembly.

SUMMARY OF THE INVENTION

In accordance with one aspect of the present invention, there is provided a barbeque grill assembly comprising a body including a first annular wall having an inner side and an outer side. At least one positioning member is fixedly mounted on the outer side of the first annular wall of the body.

A lid includes a second annular wall detachably mounted on the first annular wall of the body and having an inner side and an outer side and at least one slot defined therein for receiving the positioning member therein.

Further features of the present invention will become apparent from a careful reading of the detailed description with appropriate reference to the accompanying drawings.

DETAILED DESCRIPTION OF THE PREFERRED EMBODIMENTS

Figure 9:
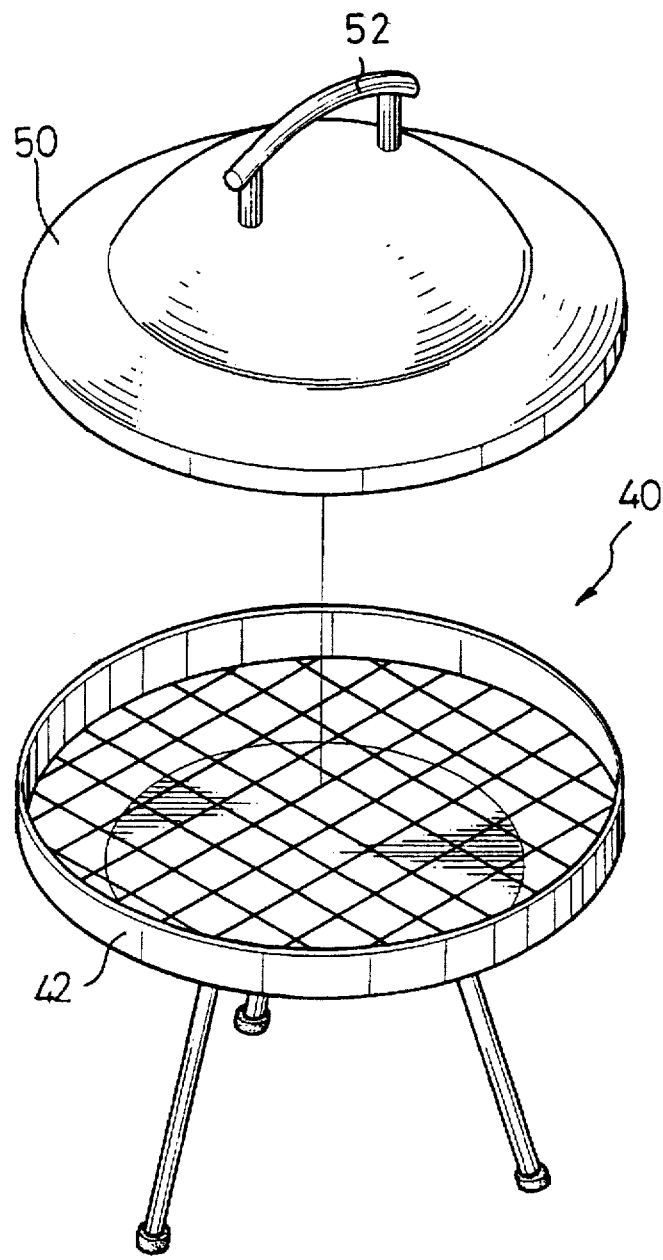
FIG. 9 is an exploded view of a conventional barbeque grill assembly in accordance with the prior art.

For a better understanding of the present invention, reference is made to FIG. 9 illustrating a conventional barbeque grill assembly in accordance with the prior art.

The conventional barbeque grill assembly comprises a body 40 having an vertical annular wall 42, and a lid 50 removably mounted on the annular wall 42 of the body 20. By such an arrangement, however, the lid 50 is easily disengaged from the body 20 when a user unintentionally exerts an upward force on a handgrip 52 of the lid 50, thereby greatly causing an inconvenience when being in use.

Referring to the remaining drawings, and initially to FIGS. 1–4, a barbeque grill assembly in accordance with a first embodiment of the present invention comprises a body 10 including a first annular wall 12 having an inner side and an outer side. The first annular wall 12 of the body 10 has three holes 122 transversely defined therein. Three positioning members are each fixedly mounted on the outer side of the first annular wall 12 of the body 10.

A lid 20 includes a second annular wall 21 detachably mounted on the first annular wall 12 of the body 10 and having an inner side and an outer side. Three slots 22 substantially inverted L-shaped are each defined in the second annular wall 21 of the lid 20 for receiving each of the three positioning members therein.

Each of the three positioning members includes a pin 18 having an enlarged head 180 abutting on the outer side of the second annular wall 21 of the lid 20, a shank 182 abutting on the outer side of the first annular wall 12 of the body 10 and received in the slot 22, a threaded portion 184 extending from the shank 182 and extending through the hole 122, and a nut 19 threadedly engaged on the threaded portion 184 and abutting on the inner side of the first annular wall 12 of the body 10. Preferably, the shank 182 of the pin 18 has a diameter greater than that of the hole 122.

Figure 1:
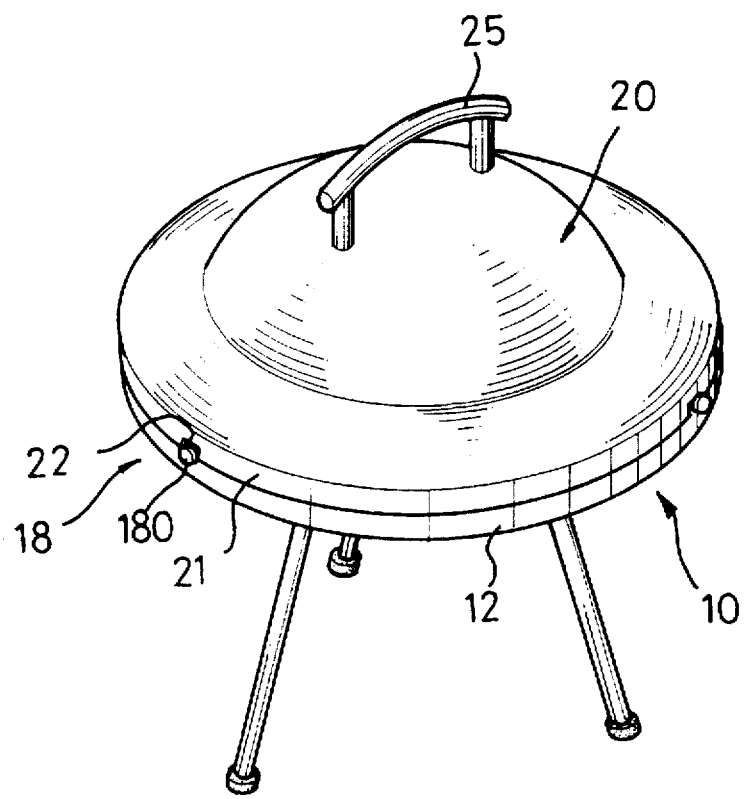
FIG. 1 is a perspective view of a barbeque grill assembly in accordance with a first embodiment of the present invention.
Figure 2:
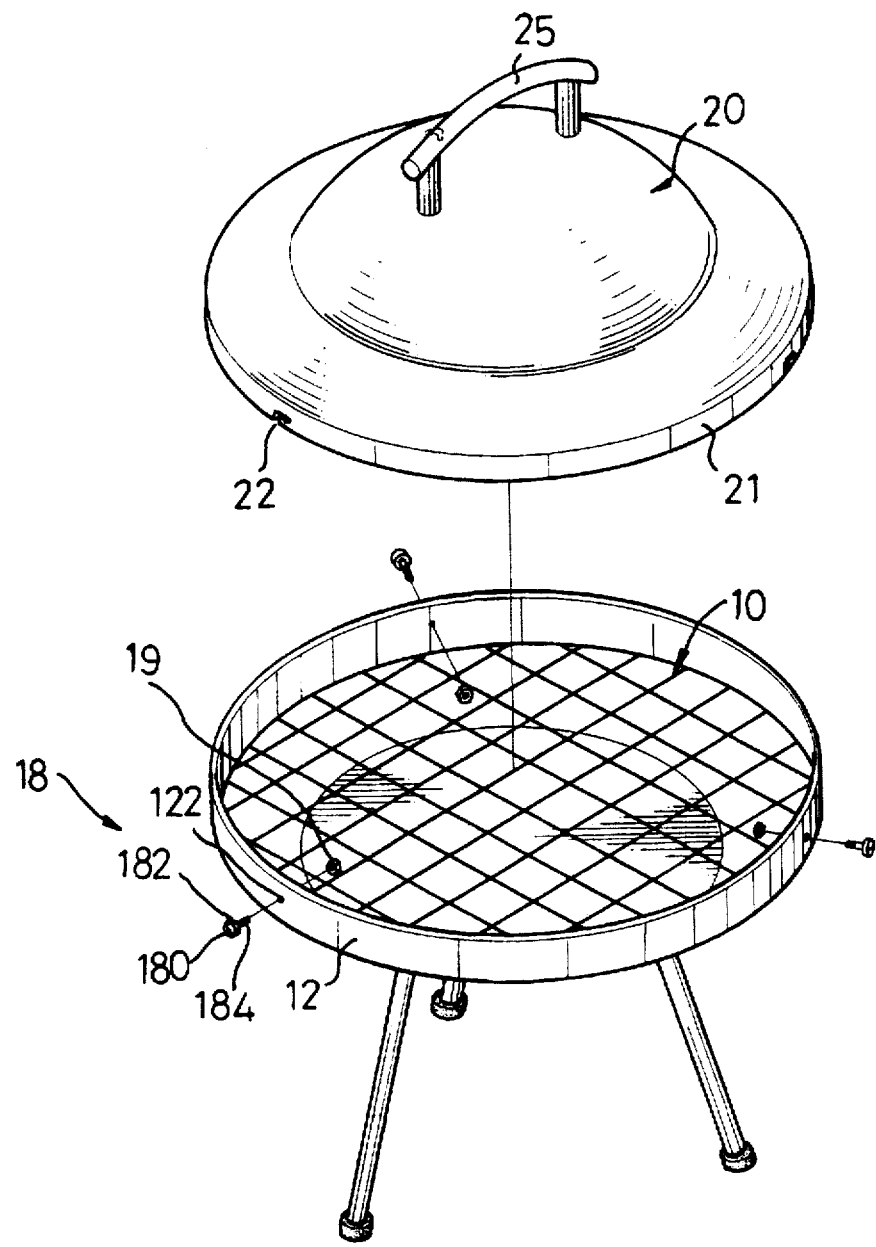
FIG. 2 is an exploded view of FIG. 1.
Figure 3:
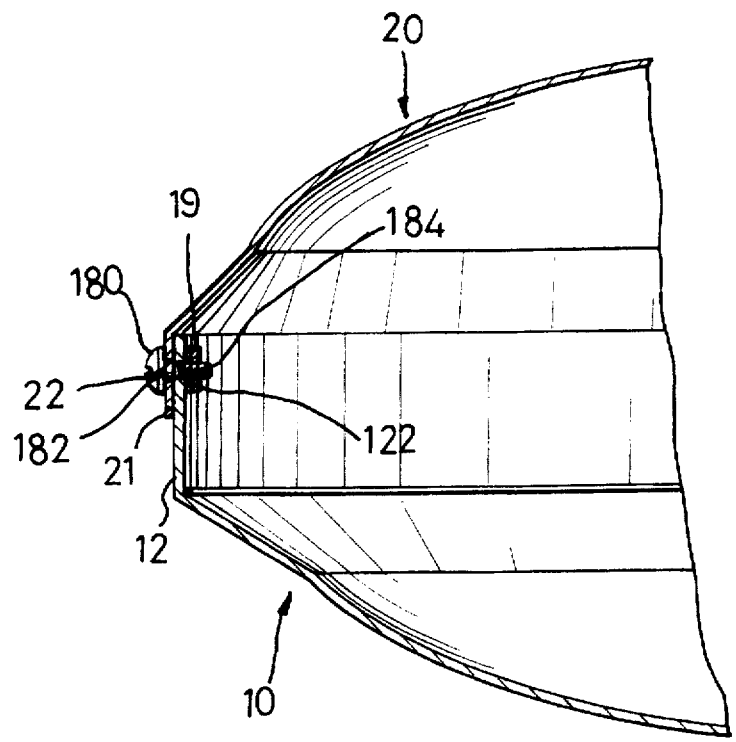
FIG. 3 is a front plan partially enlarged cross-sectional view of FIG. 1.
Figure 4:
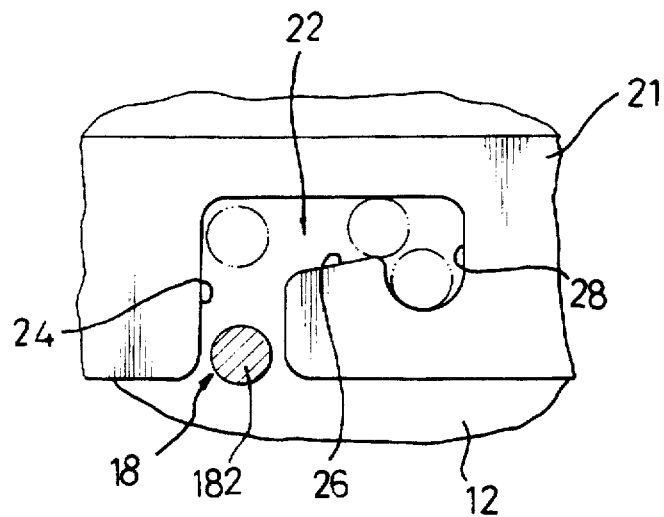
FIG. 4 is a side operational view of FIG. 3.
Figure 5:
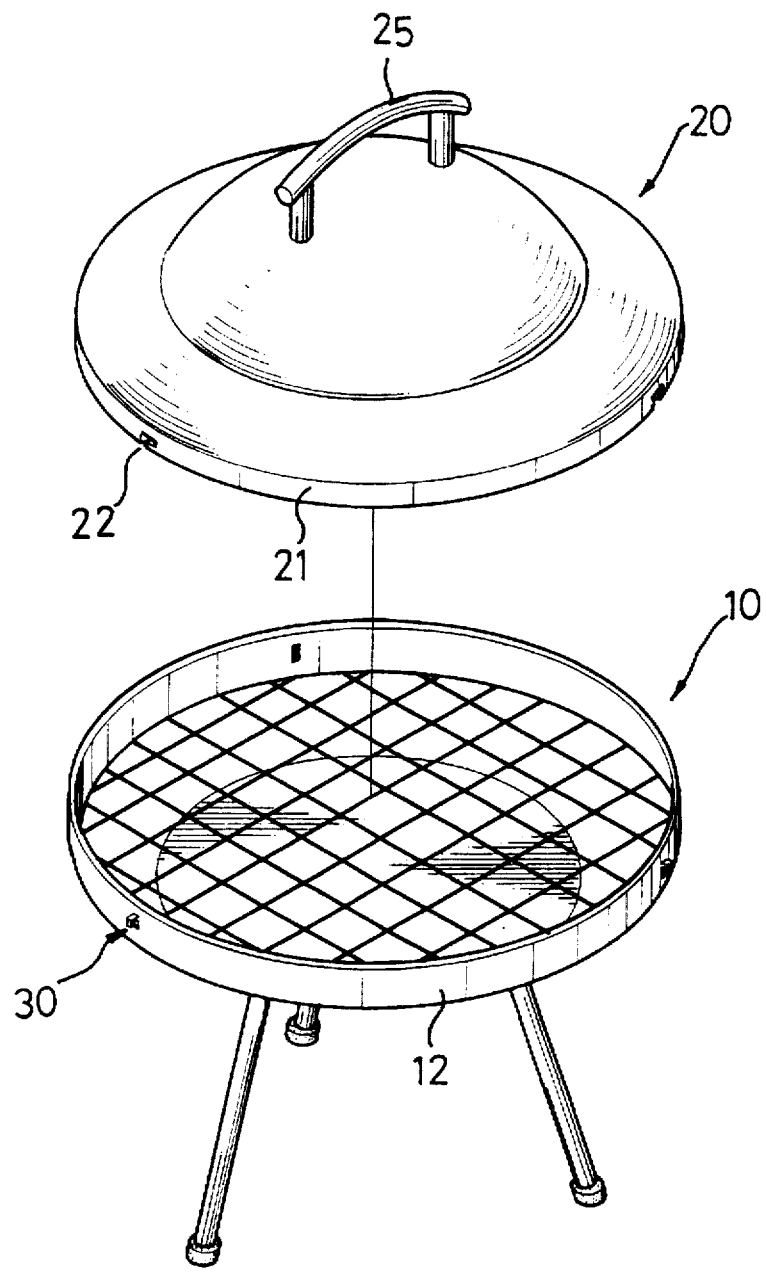
FIG. 5 is an exploded view of a barbeque grill assembly according to a second embodiment of the present invention.
Figure 6:
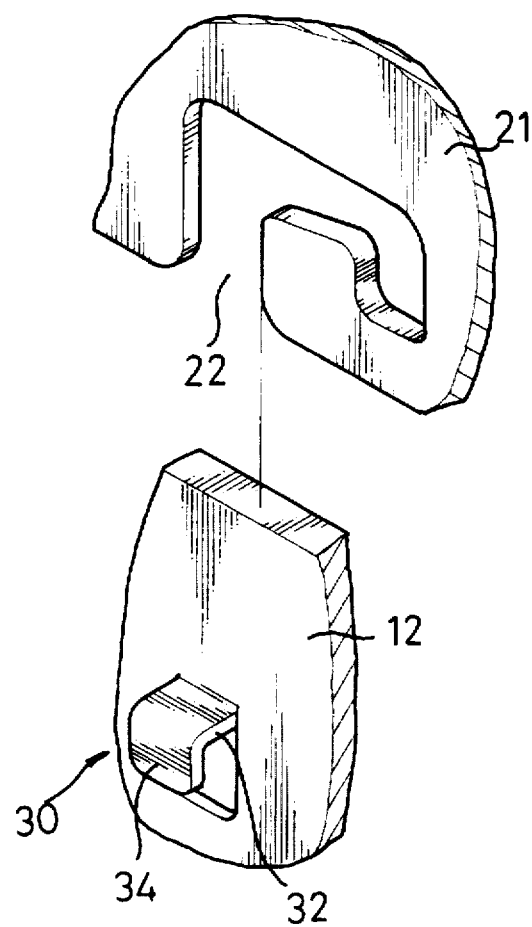
FIG. 6 is a partially enlarged view of FIG. 5.
Figure 7:
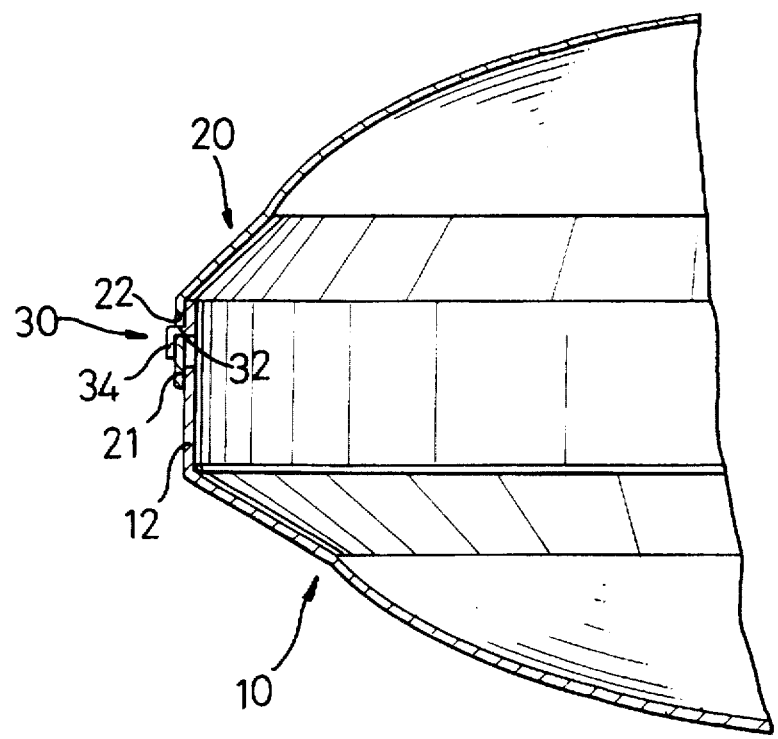
FIG. 7 is a front plan partially enlarged cross-sectional assembly view of FIG. 5.

In operation, referring to FIG. 4 with reference to FIGS. 2 and 3, the second annular wall 21 of the lid 20 can be encompassed by the first annular wall 12 of the body 10 such that the shank 182 of each of the three pins 18 can be inserted into a first passage 24 of the associated slot 22.

The second annular wall 21 of the lid 20 can then be rotated relative to the first annular wall 12 of the body 10 such that the shank 182 of each of the pins 18 can be moved into a second passage 26 of the slot 22.

Finally, the lid 20 can be moved upwardly relative to the body 10 by means of exerting an upward force on a handgrip 25 of the lid 20 such that the shank 182 of each of the pins 18 can be received into a third passage 28 of the slot 11, thereby securely retaining the lid 20 on the body 10.

Referring to FIGS. 5–8, in accordance with a second embodiment of the present invention, each of the positioning members includes a substantially inverted L-shaped flange 30 having a horizontal section 32 fixedly mounted or integrally formed on the outer side of the first annular wall 12 of the body 10 and received in an associated slot 22 and a vertical section 34 abutting on the outer side of the second annular wall 21 of the lid 20.

Figure 8:
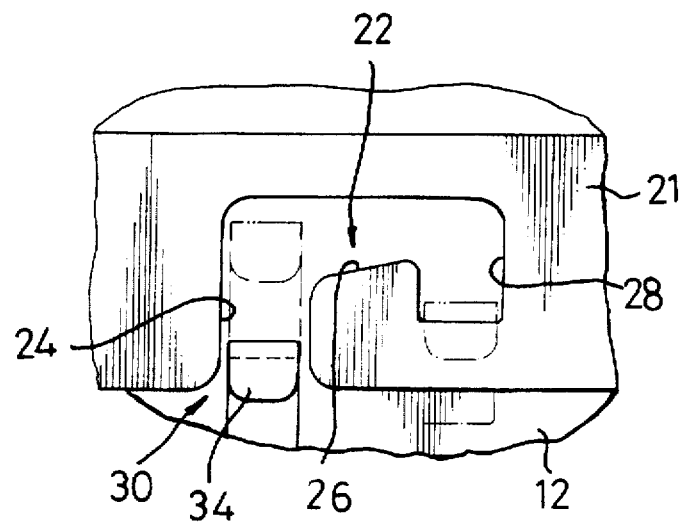
FIG. 8 is a side operational view of FIG. 7.

The operation of how each of the flanges 30 is moved into the associated slot 22 is shown in FIG. 8 and is similar to that as shown in FIG. 4 and will not be further described in detailed.

It should be clear to those skilled in the art that further embodiments of the present invention may be made without departing from the spirit and scope of the present invention.

What is claimed is:

1. A barbeque grill assembly comprising:

a body (10) including a first annular wall (12) having an inner side and an outer side;

at least one positioning member fixedly mounted on the outer side of said first annular wall (12) of said body (10); and a lid (20) including a second annular wall (21) detachably mounted on said first annular wall (12) of said body (10) and having an inner side and an outer side and at least one slot (22) defined therein for receiving said positioning member therein.

2. The barbeque grill assembly in accordance with claim 1, wherein said slot (22) is substantially inverted L-shaped.

3. The barbeque grill assembly in accordance with claim 1, wherein said first annular wall (12) of said body (10) has at least one hole (122) transversely defined therein, said positioning member including a pin (18) having a shank (182) abutting on the outer side of said first annular wall (12) of said body (10) and received in said slot (22), a threaded portion (184) extending from said shank (182) and extending through said hole (122), and a nut (19) threadedly engaged on said threaded portion (184) and abutting on the inner side of said first annular wall (12) of said body (10).

4. The barbeque grill assembly in accordance with claim 3, wherein said shank (182) of said pin (18) has a diameter greater than that of said hole (122).

5. The barbeque grill assembly in accordance with claim 3, wherein said pin (18) further includes an enlarged head (180) abutting on the outer side of said second annular wall (21) of said lid (20).

6. The barbeque grill assembly in accordance with claim 1, wherein said positioning member includes a flange (30) substantially inverted L-shaped and having a horizontal section (32) fixedly mounted on the outer side of said first annular wall (12) of said body (10) and received in said slot (22) and a vertical section (34) abutting on the outer side of said second annular wall (21) of said lid (20).

\* \* \* \* \*